US010608759B2

(12) United States Patent
Lin

(10) Patent No.: US 10,608,759 B2
(45) Date of Patent: Mar. 31, 2020

(54) METHOD AND SENSOR FOR DETECTING THE PRESENCE OF CO-CHANNEL JAMMING

(71) Applicants: Continental Automotive France, Toulouse (FR); Continental Automotive GmbH, Hannover (DE)

(72) Inventor: Chao Lin, Maurepas (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/488,997

(22) PCT Filed: Mar. 29, 2018

(86) PCT No.: PCT/FR2018/050778

§ 371 (c)(1),
(2) Date: Aug. 27, 2019

(87) PCT Pub. No.: WO2018/178581

PCT Pub. Date: Oct. 4, 2018

(65) Prior Publication Data

US 2020/0007248 A1 Jan. 2, 2020

(30) Foreign Application Priority Data

Mar. 31, 2017 (FR) ..................................... 17 52745

(51) Int. Cl.
*H04L 27/14* (2006.01)
*H04B 17/336* (2015.01)
*H04B 1/10* (2006.01)

(52) U.S. Cl.
CPC ......... *H04B 17/336* (2015.01); *H04B 1/1027* (2013.01); *H04L 27/14* (2013.01)

(58) Field of Classification Search
CPC .... H04B 1/1036; H04B 1/1081; H04B 1/082; H04B 7/0404; H04B 7/0845;
(Continued)

(56) References Cited

U.S. PATENT DOCUMENTS 5,307,515 A 4/1994 Kuo et al.
5,987,033 A 11/1999 Boer et al.
(Continued)

FOREIGN PATENT DOCUMENTS

EP 0901252 A2 3/1999

OTHER PUBLICATIONS

International Search Report and Written Opinion for International Application No. PCT/FR2018/050778, dated Jun. 11, 2018—9 pages.

(Continued)

*Primary Examiner* — Pablo N Tran
(74) *Attorney, Agent, or Firm* — RatnerPrestia

(57) ABSTRACT

A method for detecting co-channel interference in a frequency-modulated multiplexed radio signal, the method including verifying that the multiplexed radio signal has a symmetric passband; detecting and counting a plurality of positive noise peaks and a plurality of negative noise peaks in the multiplexed radio signal during a predetermined measurement duration; calculating a rate of positive or negative noise peaks among the plurality of peaks; and determining a score characteristic of a probability that co-channel interference exists in the multiplexed radio signal on the basis of the rate of positive or negative noise peaks.

10 Claims, 1 Drawing Sheet

(58) Field of Classification Search
CPC ..... H04B 17/336; H04B 1/1027; H04L 27/06; H04L 41/0826; H04L 25/03057; H04L 2025/0363; H04L 27/14
See application file for complete search history.

(56) References Cited

U.S. PATENT DOCUMENTS 6,853,633 B1 * 2/2005 Ramesh ............... H04B 14/064 370/252
6,961,019 B1 * 11/2005 McConnell ............. G01S 19/21 342/357.59
7,065,162 B1 * 6/2006 Sorrells .................... H03D 7/00 375/343
7,127,217 B2 * 10/2006 Tuttle ....................... H04B 1/18 455/87
7,319,846 B2 * 1/2008 He ............................ H04L 1/20 455/114.2
7,899,106 B2 * 3/2011 Camp, Jr. ........... H04L 27/2647 375/134
8,064,857 B2 11/2011 Jaisimha et al.
8,218,422 B2 * 7/2012 Venturino ............. H04W 16/28 370/208
8,275,324 B2 * 9/2012 Wilborn .............. H04W 52/223 455/127.2
8,649,729 B2 * 2/2014 Nightingale ............. H04K 3/28 375/134
9,246,736 B2 * 1/2016 Sorrells .................... H03C 1/62
9,407,303 B2 * 8/2016 Menon ..................... H04B 7/08
9,432,152 B2 * 8/2016 Feher ..................... G16H 10/60
10,069,712 B2 * 9/2018 Qian ....................... H04L 43/16
2005/0031064 A1 * 2/2005 Kolze .................. H04B 1/1027 375/350
2005/0239406 A1 * 10/2005 Shattil ...................... H01Q 3/26 455/63.1
2008/0102760 A1 5/2008 McConnell et al.
2012/0134394 A1 * 5/2012 Allen .................... H04L 7/0008 375/219

OTHER PUBLICATIONS

Chayavadhanangkur et al., “Analysis of FM Systems with Co-Channel Interference Using a Click Model”, IEEE Transactions on Commuications, 1976, pp. 903-910.

* cited by examiner

METHOD AND SENSOR FOR DETECTING THE PRESENCE OF CO-CHANNEL JAMMING

CROSS REFERENCE TO RELATED APPLICATIONS

This application is the U.S. National Phase Application of PCT International Application No. PCT/FR2018/050778, filed Mar. 29, 2018, which claims priority to French Patent Application No. 1752745, filed Mar. 31, 2017, the contents of such applications being incorporated by reference herein.

FIELD OF THE INVENTION

The invention relates to the field of the reception of frequency-modulated radio signals, in particular in mobile radio receivers exposed to issues with the presence of various signals transmitted on one and the same frequency.

This phenomenon, referred to as co-channel interference, occurs when various transmitters, also referred to as broadcasters, transmit different signals on one and the same channel, in other words on one and the same frequency.

An aspect of the present invention targets a method able to detect the presence of such co-channel interference, and a sensor able to implement said method.

BACKGROUND OF THE INVENTION

As is known, a radio receiver, in particular in a multimedia system of a motor vehicle, is able to receive a radio signal, in particular an FM radio signal, FM being the acronym for frequency modulation.

Such an FM radio signal, received in modulated form by a radio receiver, is subjected to various sensors and to suitable filtering so that the corresponding demodulated radio signal is able to be played back under good conditions, in particular in the passenger compartment of a motor vehicle.

Those skilled in the art know the operating principle of an FM, that is to say frequency-modulated, radio signal received by a suitable radio receiver, with a view to being demodulated and then played back to listeners.

One known issue that affects the reception of an FM radio signal via a mobile radio receiver, in particular integrated into a motor vehicle, lies in the fact that the reception of an FM radio signal on a channel may be subject to interference through the presence of another separate FM radio signal on the same channel.

When this occurs, more often than not due to an incorrectly defined frequency plan, two or even more radio signals may be received by a radio receiver.

To detect the presence of co-channel interference, the prior art does not disclose any dedicated sensor. The presence of co-channel interference is thus inferred, in the prior art, by way of interpreting information from existing sensors: signal level sensor, multipath detector (typically corresponding to a sensor for sensing the presence of an amplitude modulation of the signal when the radio receiver under consideration is an FM receiver), and noise sensor.

In the prior art, it is known to combine this information, via a more or less complex matrix, in order to determine a probability that co-channel interference is currently present.

For example, if an amplitude modulation is detected in the reception of an FM radio signal, then the presence of multipath interference or co-channel interference may be deduced.

Document U.S. Pat. No. 8,064,857, incorporated herein by reference, describes one example of such a technique.

These probabilistic estimations implemented in the prior art do not make it possible to determine with a high level of confidence whether or not co-channel interference exists.

However, this determination is important in order to allow the radio receiver under consideration to implement optimum signal processing in order to attenuate or even remove the current interference.

SUMMARY OF THE INVENTION

In this context, an aspect of the present invention aims to allow improved detection of the presence of co-channel interference. An aspect of the invention thus relates to a method for detecting the presence of co-channel interference, and to a dedicated sensor implementing said method.

More precisely, one subject of an aspect of the present invention is a method for detecting co-channel interference in a frequency-modulated multiplexed radio signal, said method comprising the following steps:

- verifying that said multiplexed radio signal has a symmetric passband;
- detecting and counting a plurality of positive noise peaks and a plurality of negative noise peaks in said multiplexed radio signal during a predetermined measurement duration;
- calculating a rate of positive or negative noise peaks among said plurality of peaks;
- determining a score characteristic of a probability that co-channel interference exists in said multiplexed radio signal on the basis of said rate of positive or negative noise peaks.

By virtue of the method according to an aspect of the invention, it is possible to detect the presence of co-channel interference, that is to say the presence of an undesired radio signal on the same frequency as the desired radio signal, by way of a dedicated method.

Advantageously, a positive or negative noise peak is taken into account only if said multiplexed radio signal has a symmetric passband.

According to one embodiment, the method according to an aspect of the invention moreover comprises a prior step of comparing the signal-to-noise ratio of the multiplexed radio signal with a predetermined threshold, a positive or negative noise peak being taken into account only if said signal-to-noise ratio in said multiplexed radio signal is greater than said predetermined threshold, said predetermined threshold preferably being equal to 20 dB.

Advantageously, said predetermined measurement time is equal to 128 ms, plus or minus 10 MS.

According to one embodiment, said score is determined as being equal to:

$$1 - K \times \frac{\text{abs}(N_{mean}^{+} - N_{mean}^{-})}{N_{mean}^{v}}$$

where $N_{mean}^{+}$ is the rate of positive noise peaks averaged over the predetermined measurement duration, $N_{mean}^{-}$ is the rate of negative noise peaks averaged over the predetermined measurement duration, $N_{mean}^{v}$ is the total number of noise peaks taken into account, and K is a scale factor to be determined.

According to one embodiment, the score characteristic of a probability that co-channel interference exists is determined only if the number of counted positive or negative noise peaks is greater than a predetermined threshold, preferably equal to 48.

An aspect of the present invention also targets a co-channel interference detection system, comprising a computer having computing means and a memory space, and means for detecting positive and negative noise peaks in a multiplexed radio signal, said computing means, the memory space, and said means for detecting positive and negative noise peaks being designed to implement the method such as described briefly above.

An aspect of the present invention also targets a radio receiver comprising a co-channel interference detection system such as described briefly above, configured so as to implement the method according to an aspect of the invention.

An aspect of the present invention furthermore targets a motor vehicle comprising such a radio receiver.

BRIEF DESCRIPTION OF THE DRAWINGS

Aspects of the invention will be better understood on reading the following description, given solely by way of example, and with reference to the appended drawings, in which.

DETAILED DESCRIPTION OF THE PREFERRED EMBODIMENTS

Figure 1:
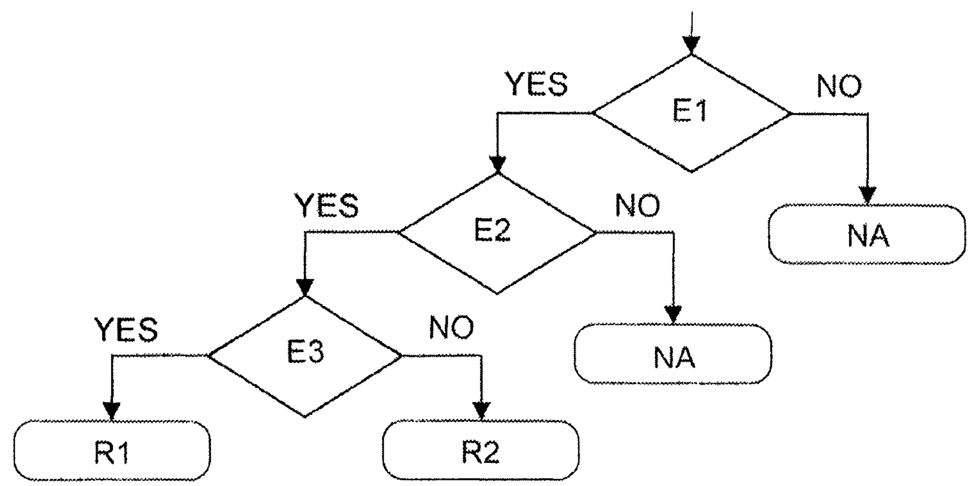
FIG. 1 shows a flowchart presenting the operating principle of the co-channel interference detection method according to an aspect of the invention.

The method for detecting co-channel interference in an FM radio signal is presented in more detail below, according to an aspect of the invention, primarily for the purpose of implementation in a radio receiver of an on-board multimedia system in a motor vehicle.

However, the implementation of an aspect of the present invention in any other technical field, in particular in any type of FM radio receiver, is also targeted.

From a theoretical point of view, an aspect of the present invention refers to the document "C. CHAYAVADHANANGKUR et al., Analysis of FM Systems with Co-Channel Interference Using a Click Model, IEEE TRANSACTIONS ON COMMUNICATIONS", incorporated herein by reference, in which the authors discuss the stochastic property of noise in a signal subject to co-channel interference.

It has thus been demonstrated that, in an FM radio signal, the noise may be decomposed into the sum of a white noise and of "click noise", i.e. "noise peaks", corresponding to impulse noise, forming "diracs" in the FM radio signal. This typically occurs when the demodulator of the radio receiver under consideration "hops" to a neighboring radio signal, be this an adjacent radio signal, that is to say a signal at a neighboring frequency, or a co-channel signal, that is to say a signal on the same frequency, or even a signal due to a multipath phenomenon.

However, the distribution of these noise peaks may be analyzed statistically in order to identify the possible presence of co-channel interference, accurately identifying such interference then leading to the possibility of appropriate specific processing.

From a theoretical point of view, it has therefore been demonstrated, in particular in the document by C. CHAYAVADHANANGKUR et al. cited above, that the presence of co-channel interference resulted, at the output of the demodulator of the radio receiver under consideration, in the presence of a term having a high signal-to-noise ratio, which may be decomposed into "click noise", that is to say positive and negative noise peaks that occur randomly and independently, added to a base term.

If the signal-to-noise ratio is sufficient, or more precisely, in practice, if the energy ratio between the part close to the carrier of the multiplexed radio signal and the rest of the signals in baseband is sufficiently high, and when the passband of said multiplexed radio signal is symmetric, or in particular made symmetric by way of applying a suitable filter FI, the occurrence of positive and negative noise peaks follow two independent Poisson distributions with a similar peak occurrence rate. In other words, the number of detected positive noise peaks and the number of detected negative noise peaks, over a sufficiently long predetermined time range, are substantially equal.

Now, by contrast, if the noise peaks present in the received multiplexed signal were to be due to the presence of an adjacent radio signal, said noise peaks would be present only on the side of the positive peaks or only on the side of the negative peaks.

Considering that, if the noise peaks are due to the presence of a co-channel signal, said noise peaks have as much chance of occurring on the positive side as on the negative side of the received multiplexed signal, when the latter has a symmetric passband, an aspect of the present invention proposes a method for detecting co-channel interference that is based on counting the positive and negative noise peaks detected in a symmetric multiplexed FM radio signal.

An aspect of the present invention therefore proposes to analyze the noise in a received multiplexed FM radio signal, over the duration, in order to determine the rate of positive and negative noise peaks, making it possible to detect interference due to co-channel interference.

FIG. 1 presents a flowchart showing the operating principle of the method for detecting the presence of co-channel interference according to an aspect of the invention.

The method according to an aspect of the invention preferably comprises a first step E1 of verifying that the signal-to-noise ratio measured in the multiplexed radio signal under consideration is indeed greater than a predetermined threshold. The predetermined threshold is typically around 20 dB.

In a second step E2, the method according to an aspect of the invention preferably makes provision to verify that the multiplexed radio signal under consideration indeed has a symmetric passband. According to one preferred embodiment, the method according to an aspect of the invention comprises a step of processing the multiplexed radio signal so as to cancel out the average value of the signal in order to remove the low-frequency components therefrom and thus promote the detection of the noise peaks.

At the end of the first and second steps, there is provision, if the corresponding tests are not satisfactory, for the method to determine that it is not able to verify whether or not co-channel interference is currently present (step NA in FIG. 1).

Thus, when the signal-to-noise ratio is lower than the predetermined threshold, the method determines that it is not able to verify whether or not co-channel interference is currently present.

Likewise, when the multiplexed radio signal under consideration has a non-symmetric passband, the method determines that it is not able to verify whether or not co-channel interference is currently present.

In the scenario in which the signal-to-noise ratio measured in the multiplexed radio signal under consideration is indeed greater than the predetermined threshold and in which said signal indeed has a symmetric passband, the method according to an aspect of the invention provides a step E3 of detecting and counting the positive and negative noise peaks that are present in said multiplexed radio signal under consideration. This step of detecting and counting the positive and negative noise peaks takes place over a predetermined time range, for example equal to 128 ms, as described in the example outlined below. A noise peak is detected when the noise level, in terms of absolute value, is greater than a predetermined threshold, which is identical for the positive noise peaks and for the negative noise peaks.

If the number of detected valid positive noise peaks is substantially equal to the number of detected valid negative noise peaks, and preferably greater than a minimum number of valid detected noise peaks, then the method according to an aspect of the invention determines that co-channel interference is currently present, or at least that the probability that co-channel interference is currently present is high (step R1).

In the opposite case, the method according to an aspect of the invention determines that no co-channel interference is currently present, or at least that the probability that co-channel interference is currently present is low (step R2).

In practice, the method according to an aspect of the invention makes provision to calculate a score representative of said probability that co-channel interference is currently present.

It is specified that the minimum number of valid detected noise peaks is for example equal to 48 per period corresponding to the predetermined measurement duration, in order to have a statistically significant evaluation.

It should moreover be noted that "valid" noise peak is understood to mean a noise peak that is effectively taken into account, insofar as the signal-to-noise ratio is indeed greater than the predetermined threshold (step E1) and insofar as the multiplexed radio signal under consideration is indeed symmetric (step E2). It is also specified that 'substantially equal' number of positive and negative peaks" is understood to mean that the number of detected positive noise peaks is equal to the number of detected negative noise peaks plus or minus 20%.

Exemplary, implementation of the method:

According to one non-limiting numerical exemplary implementation, consideration is given to a received multiplexed FM radio signal. This signal is sampled at a sampling frequency of 384 kHz. Each increment of 1 ms of sampled signal, representing 192 signal samples, is stored in a buffer memory of a computer of the radio receiver under consideration.

For the $i^{th}$ increment of 1 ms, corresponding to an $i^{th}$ buffer memory, the number of counted valid positive noise peaks is denoted $N^+_i$, whereas the number of counted valid negative noise peaks is denoted $N^-_i$.

It is recalled that a noise peak is taken into account, that is to say considered to be valid, if and only if the passband of the multiplexed radio signal, for example after suitable processing, is symmetric, and if the signal-to-noise ratio is greater than a predetermined threshold.

The total number of valid detected noise peaks is denoted $N^v_i$ in the buffer memory i under consideration.

In this example, the probability score that co-channel interference is currently present, determined in accordance with the method according to an aspect of the invention, is thus evaluated over a sliding time window of 128 ms, in accordance with the "first in, first out" principle, or FIFO according to the acronym known to those skilled in the art.

The rate of valid positive noise peaks is calculated using the following formula:

$$N^+_{mean} = \frac{1}{128}\sum_{i=0}^{127} N^+_i$$

The rate of valid negative noise peaks is calculated using the following formula:

$$N^-_{mean} = \frac{1}{128}\sum_{i=0}^{127} N^-_i$$

The rate of detected valid noise peaks over the time window is calculated using the following formula:

$$N^v_{mean} = \frac{1}{128}\sum_{i=0}^{127} N^v_i$$

According to one embodiment, this results in the following calculation of a score $\text{Cochannel}_{score}$ characteristic of the probability that co-channel interference exists in the multiplexed radio signal under consideration;

$$Cochannel_{score} = 1 - K \times \frac{\text{abs}(N^+_{mean} - N^-_{mean})}{N^v_{mean}}, \text{ where } N^v_{mean} > 0$$

in which K is a scale factor to be determined in order to adjust the calculation of the score.

Figure 2:
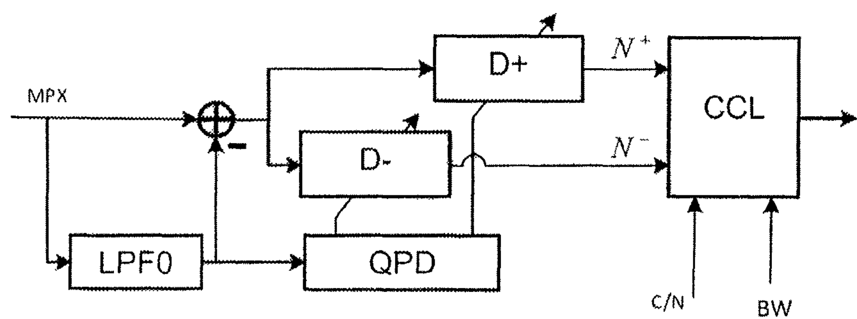
FIG. 2 shows a basic diagram of the co-channel interference detection system according to an aspect of the invention.

With reference to FIG. 2, an aspect of the present invention moreover consists of a system for detecting co-channel interference in a multiplexed FM radio signal MPX, said system forming a co-channel interference sensor. The co-channel interference detection system preferably comprises a zero-phase low-pass filter LPFO for removing the baseline of the multiplexed FM radio signal MPX, so that the peaks are able to be detected optimally via peak detection means QPD, without introducing any phase shift.

Means QPD for detecting peaks in the radio signal make it possible to detect impulse noise in the multiplexed radio signal MPX.

Means D+ and D− for detecting and counting positive peaks and negative peaks, respectively, make it possible to determine the number of positive and negative noise peaks, also referred to as "click noise", N+ and N−, respectively, in the multiplexed radio signal MPX over a predetermined time window.

The co-channel interference detection system furthermore includes decision means CCL able to determine a score characteristic of the probability that co-channel interference exists in the multiplexed radio signal MPX, depending on the number of positive N+ and negative N− noise peaks detected over the predetermined time window. As seen above, the probability of co-channel interference is high if the number of detected positive noise peaks N+ and the number of detected negative noise peaks N− are similar.

According to the embodiment that is shown, the decision means CCL, in order to determine whether co-channel interference is currently present, also take into account the value of the ratio C/N, corresponding to a signal-to-noise ratio calculated on the multiplexed radio signal. In practice, the signal-to-noise ratio C/N must be greater than a predetermined threshold, typically of the order of 20 dB, and failing this the decision means consider that they are not be able to determine whether or not co-channel interference is currently present.

Furthermore, still according to the embodiment that is shown, the decision means CCL, in order to determine whether co-channel interference is currently present, verify that the multiplexed radio signal MPX has a symmetric passband BW. In the opposite case, the decision means consider that they are not able to determine whether or not co-channel interference is currently present.

Such a system for detecting the presence of co-channel interference in a multiplexed FM radio signal thus consists, according to one embodiment, of a computer including computing means and an integrated memory, and of means for detecting positive and negative noise peaks, allowing the co-channel interference detection method described above to be implemented, so as to form a co-channel interference sensor.

It is furthermore specified that aspects of the present invention are not limited to the embodiment described above, and is open to variants accessible to those skilled in the art.

The invention claimed is:

1. A method for detecting co-channel interference in a frequency-modulated multiplexed radio signal, said method comprising:

verifying that said multiplexed radio signal has a symmetric passband;

detecting and counting a plurality of positive noise peaks and a plurality of negative noise peaks in said multiplexed radio signal during a predetermined measurement duration;

calculating a rate of positive or negative noise peaks among said plurality of peaks; and determining a score characteristic of a probability that co-channel interference exists in said multiplexed radio signal on the basis of said rate of positive or negative noise peaks.

2. The method as claimed in claim 1, wherein a positive or negative noise peak is taken into account only if said multiplexed radio signal has a symmetric passband.

3. The method as claimed in claim 2, comprising a prior step of comparing the signal-to-noise ratio of the multiplexed radio signal with a predetermined threshold, a positive or negative noise peak being taken into account only if said signal-to-noise ratio in said multiplexed radio signal is greater than said predetermined threshold, said predetermined threshold preferably being equal to 20 dB.

4. The method as claimed in claim 1, comprising a prior step of comparing the signal-to-noise ratio of the multiplexed radio signal with a predetermined threshold, a positive or negative noise peak being taken into account only if said signal-to-noise ratio in said multiplexed radio signal is greater than said predetermined threshold, said predetermined threshold preferably being equal to 20 dB.

5. The method as claimed in claim 1, wherein said predetermined measurement time is equal to 128 ms, plus or minus 10 ms.

6. The method as claimed in claim 1, wherein said score is determined as being equal to:

$$1 - K \times \frac{\text{abs}(N^{+}_{mean} - N^{-}_{mean})}{N^{v}_{mean}}$$

where $N_{mean}^{+}$ is the rate of positive noise peaks averaged over the predetermined measurement duration, $N_{mean}^{-}$ is the rate of negative noise peaks averaged over the predetermined measurement duration, $N_{mean}^{v}$ is the total number of noise peaks taken into account, and K is a scale factor to be determined.

7. The method as claimed in claim 1, wherein the score characteristic of a probability that co-channel interference exists is determined only if the number of positive or negative noise peaks taken into account is greater than a predetermined threshold, preferably equal to 48.

8. A co-channel interference detection system, comprising a computer having computing means and a memory space, and means for detecting positive and negative noise peaks in a multiplexed radio signal, said computing means, the memory space, and said means for detecting positive and negative noise peaks being designed to implement the method as claimed in claim 1.

9. A radio receiver comprising a co-channel interference detection system as claimed in claim 8.

10. A motor vehicle comprising a radio receiver as claimed claim 9.

* * * * *